United States Patent
Matsuda et al.

(10) Patent No.: US 11,198,766 B2
(45) Date of Patent: Dec. 14, 2021

(54) METHOD FOR PRODUCING MOLDED ARTICLE

(71) Applicant: Teijin Limited, Osaka (JP)

(72) Inventors: Takeshi Matsuda, Osaka (JP); Takuro Kitamura, Osaka (JP)

(73) Assignee: Teijin Limited, Osaka (JP)

( * ) Notice: Subject to any disclaimer, the term of this patent is extended or adjusted under 35 U.S.C. 154(b) by 274 days.

(21) Appl. No.: 15/777,937

(22) PCT Filed: Nov. 18, 2016

(86) PCT No.: PCT/JP2016/084362
§ 371 (c)(1),
(2) Date: May 22, 2018

(87) PCT Pub. No.: WO2017/090544
PCT Pub. Date: Jun. 1, 2017

(65) Prior Publication Data
US 2018/0346663 A1    Dec. 6, 2018

(30) Foreign Application Priority Data

Nov. 24, 2015  (JP) .............................. JP2015-228808

(51) Int. Cl.
*C08J 3/20* (2006.01)
*C08K 3/16* (2006.01)
(Continued)

(52) U.S. Cl.
CPC ............. *C08J 3/203* (2013.01); *B29C 43/003* (2013.01); *C08J 5/10* (2013.01); *C08K 3/04* (2013.01);
(Continued)

(58) Field of Classification Search
CPC ...... C08K 3/04; C08K 3/16; C08K 2201/014; C08K 7/06; B29K 2505/10;
(Continued)

(56) References Cited

U.S. PATENT DOCUMENTS

| 5,922,265 A | * | 7/1999 | Parekh | ................... B29C 43/18 |
| | | | | 264/257 |
| 2006/0183841 A1 | * | 8/2006 | Aneja | ..................... H01B 1/24 |
| | | | | 524/495 |

(Continued)

FOREIGN PATENT DOCUMENTS

| CN | 106995619 A | * | 8/2017 |
| EP | 3093312 A1 | | 11/2016 |

(Continued)

OTHER PUBLICATIONS

English translation of JP 2014118426 A (Year: 2014).*
(Continued)

*Primary Examiner* — Leith S Shafi
*Assistant Examiner* — Inja Song
(74) *Attorney, Agent, or Firm* — Banner & Witcoff, Ltd.

(57) ABSTRACT

The present invention provides a method for producing a molded article by pressing a composite material containing a resin composition and carbon fibers, wherein the resin composition contains a polyamide resin, a copper compound and potassium halide, and (1) the copper compound content is 0.1 parts by mass or more relative to 100 parts by mass of the polyamide resin.

16 Claims, 1 Drawing Sheet

(51) Int. Cl.
*C08K 3/04* (2006.01)
*C08L 77/00* (2006.01)
*C08J 5/10* (2006.01)
*B29C 43/00* (2006.01)
*C08K 7/06* (2006.01)
*B29C 43/02* (2006.01)
*B29K 77/00* (2006.01)
*B29C 35/08* (2006.01)
*B29K 509/00* (2006.01)
*B29K 505/10* (2006.01)
*B29K 105/12* (2006.01)
*B29K 105/16* (2006.01)
*C08J 5/04* (2006.01)
*B29L 31/30* (2006.01)

(52) U.S. Cl.
CPC ............. *C08K 3/16* (2013.01); *C08K 7/06* (2013.01); *C08L 77/00* (2013.01); *B29C 43/02* (2013.01); *B29C 2035/0822* (2013.01); *B29K 2077/00* (2013.01); *B29K 2105/12* (2013.01); *B29K 2105/16* (2013.01); *B29K 2505/10* (2013.01); *B29K 2509/00* (2013.01); *B29L 2031/30* (2013.01); *C08J 5/042* (2013.01); *C08J 2377/02* (2013.01); *C08K 2201/014* (2013.01)

(58) Field of Classification Search
CPC ............ B29K 2105/12; B29K 2105/16; B29K 2077/00; B29K 2509/00; C08J 5/042; C08J 3/203; C08J 2377/02; C08J 5/10; C08L 77/00; B29C 43/003; B29C 43/02; B29C 2035/0822; B29L 2031/30
See application file for complete search history.

(56) References Cited

U.S. PATENT DOCUMENTS

| | | | | |
|---|---|---|---|---|
| 2009/0142585 A1* | 6/2009 | Kobayashi | ............. | C08L 77/00 428/328 |
| 2010/0305257 A1* | 12/2010 | Trouillet-Fonti | ....... | C08L 77/06 524/413 |
| 2011/0039470 A1 | 2/2011 | Wakeman et al. | | |
| 2012/0108126 A1* | 5/2012 | Elia | ..................... | B29C 45/0001 442/59 |
| 2013/0062806 A1 | 3/2013 | Mitadera | | |
| 2014/0080949 A1* | 3/2014 | Roth | ....................... | C08K 3/16 524/154 |
| 2014/0296414 A1 | 10/2014 | Hattori et al. | | |
| 2015/0048539 A1 | 2/2015 | Mitadera | | |
| 2015/0274968 A1* | 10/2015 | Bayer | ..................... | C08K 5/00 523/437 |
| 2016/0122487 A1* | 5/2016 | Percec | ....................... | C08J 5/06 442/179 |
| 2016/0280914 A1* | 9/2016 | Thomas | .................... | C08K 3/22 |
| 2016/0297120 A1* | 10/2016 | Lamberts | ............ | C08L 23/0884 |
| 2016/0333168 A1 | 11/2016 | Joachimi et al. | | |
| 2017/0166713 A1* | 6/2017 | Benighaus | ................. | C08J 5/10 |
| 2021/0070955 A1* | 3/2021 | Reese | .................... | B29C 65/00 |

FOREIGN PATENT DOCUMENTS

| | | | |
|---|---|---|---|
| JP | 2012-021062 A | | 2/2012 |
| JP | 2012-255063 A | | 12/2012 |
| JP | 2013-064106 A | | 4/2013 |
| JP | 2014-118426 A | | 6/2014 |
| JP | 2014118426 A | * | 6/2014 |
| JP | 2015-030833 A | | 2/2015 |
| JP | 2015-140353 A | | 8/2015 |
| WO | 2012-140785 A1 | | 10/2012 |
| WO | 2013-080820 A1 | | 6/2013 |
| WO | 2015/071198 A1 | | 5/2015 |

OTHER PUBLICATIONS

English translation of CN-106995619-A (Year: 2017).*
Jul. 30, 2019—(EP) Communication pursuant to Article 94(3) EPC—App 16868491.8.
Feb. 21, 2017—(PCT/JP) Written Opinion of the International Searching Authority—App 2016/084362—Eng Tran.
Nov. 6, 2018—(EP) Supplementary Search Report—App 16868491.8.
Feb. 21, 2017—International Search Report—App PCT/JP2016/084362.

* cited by examiner

METHOD FOR PRODUCING MOLDED ARTICLE

CROSS REFERENCE TO RELATED APPLICATIONS

This is a U.S. National Phase Application under 35 U.S.C. § 371 of International Application No. PCT/JP2016/084362, filed Nov. 18, 2016, which claims priority to Japanese Application No. 2015-228808, filed Nov. 24, 2015, the entire contents of each of which are incorporated herein by reference.

TECHNICAL FIELD

The present invention relates to a method for producing a molded article.

BACKGROUND ART

In recent years, much attention is placed on a so-called fiber-reinforced resin molded article containing carbon fibers and a thermoplastic resin in a mechanical field. Particularly when a polyamide resin is contained in a fiber-reinforced resin composite material, a copper-based stabilizer is known as a heat stabilizer thereof.

For example, Patent Document 1 discloses a thermoplastic resin composition containing a polyamide resin and discontinuous carbon fibers, wherein copper halide or a derivative thereof is contained as a heat stabilizer.

Patent Document 2 discloses a resin composition containing a polyamide resin, potassium halide and a copper compound, and further discloses injection molding of the resin composition containing carbon fibers as an optional component.

Patent Document 3 discloses the invention that a copper compound is contained as a heat stabilizer in a composite material containing a polyamide resin and discontinuous carbon fibers, and the composite material is subjected to cold pressing to obtain a press-molded article.

PRIOR ART DOCUMENTS

Patent Document
Patent Document 1: JP-A-2015-140353
Patent Document 2: JP-A-2015-30833
Patent Document 3: JP-A-2014-118426

SUMMARY OF THE INVENTION

Problems to be Solved by the Invention

However, in Patent Document 1, a composite material is subjected to hot press molding, and the problems inherent in cold press molding are not referred to therein at all. For this reason, the decrease of a molecular weight on the surface of a molded article generated by directly contacting oxygen in high temperature environment during preheating is an urgent problem that is not yet solved, and is inherent in cold press molding.

The resin composition described in Patent Document 2 is a resin composition investigated toward injection molding and does not yet solve the problem inherent in cold press molding, similar to Patent Document 1. In an injection-molded article using the resin composition described in Patent Document 2, the molecular weight on the surface of the molded article does not substantially decrease, and as a result, poor appearance does not become a problem.

In Patent Document 3, a copper-based stabilizer is added for improving heat stability, but the investigations are not made from the standpoint that for improving moldability, a composite material is heated under severer conditions, thereby preventing the decrease of a molecular weight on the surface of a molded article obtained. Thus, a molded article sufficiently durable to practical use is required.

In view of the above, an object of the present invention is to provide a method for producing a molded article in which the decrease of a molecular weight on the surface of a molded article obtained is small and appearance is satisfactory, even though a molding material is exposed to sever high temperature and oxygen atmosphere in a heating step for securing excellent moldability in cold press molding capable of molding in short tact time.

Means for Solving the Problems

To solve the above problems, the present invention provides the following means.

<1>. A method for producing a molded article by pressing a composite material containing a resin composition and carbon fibers, wherein the resin composition contains a polyamide resin, a copper compound and potassium halide, and (1) the copper compound content is 0.1 parts by mass or more relative to 100 parts by mass of the polyamide resin.

<2>. The method for producing a molded article described in <1>, wherein (2) a mass ratio of potassium halide/copper compound is more than 0 and 3.0 or less.

<3>. The method for producing a molded article described in <1> or <2>, wherein the potassium halide is potassium iodide and the copper compound is copper iodide.

<4>. The method for producing a molded article described in any one of <1> to <3>, wherein the pressing is cold pressing.

<5>. The method for producing a molded article described in any one of <1> to <4>, wherein the resin composition contains a black pigment.

<6>. The method for producing a molded article described in any one of <1> to <5>, wherein a ratio of a number average molecular weight of the polyamide resin present in a surface layer region of the molded article to a number average molecular weight of the polyamide resin present in a central region thereof is more than 0.4 and less than 1.0, wherein the surface layer region is a region of less than 50 μm from the surface of the molded article, and the central region is a region of less than 50 μm toward the surface from a central cross-section of the molded article.

<7>. The method for producing a molded article described in <6>, wherein the number average molecular weight of the polyamide resin present in the surface layer region is 7000 or more.

<8>. The method for producing a molded article described in <6> or <7>, wherein the copper compound and potassium halide are present in the surface layer region of the molded article.

<9>. The method for producing a molded article described in any one of <1> to <8>, wherein the carbon fibers are discontinuous carbon fibers having a weight average fiber length of 1 mm or more and 100 mm or less.

Advantageous Effect of the Invention

The molded article obtained by the production method in the present invention has an excellent surface appearance in which the decrease of a molecular weight on the surface is suppressed.

MODE FOR CARRYING OUT THE INVENTION

[Carbon Fibers]

Polyacrylonitrile (PAN) based fibers, petroleum and coal pitch carbon fibers, rayon carbon fibers, cellulose carbon fibers, lignin carbon fibers, phenol carbon fibers, gas phase growth carbon fibers and the like are generally known as the carbon fibers used in the present invention. Any of those carbon fibers can be suitably used in the present invention.

Above all, it is preferred in the present invention to use polyacrylonitrile (PAN) based carbon fibers from the standpoint of excellent tensile strength. When PAN-based carbon fibers are used as the carbon fibers, its tensile modulus is preferably in a range of 100 GPa to 600 GPa, more preferably 200 GPa to 500 GPa, and still more preferably 230 to 450 GPa. Furthermore, the tensile strength is preferably in a range of 2000 MPa to 10000 MPa, and more preferably 3000 MPa to 8000 MPa.

The carbon fibers used in the present invention may have a sizing agent adhered to the surface thereof. When the carbon fibers having a sizing agent adhered thereto are used, the kind of the sizing agent can be appropriately selected depending on the kind of carbon fibers and a matrix resin, and is not particularly limited.

(Fiber Length)

Fiber length of the carbon fibers used in the present invention is not particularly limited, and continuous fibers and discontinuous carbon fibers can be used.

The carbon fibers used in the present invention are preferably discontinuous carbon fibers having a weight average fiber length Lw of 1 to 100 mm. The weight average fiber length of the discontinuous carbon fibers is more preferably 3 to 80 mm, and still more preferably 5 to 60 mm. When the weight average fiber length is 100 mm or less, flowability of a composite material is not deteriorated, and a molded article having a desired shape is obtained in press molding. On the other hand, when the weight average fiber length is 1 mm or more, mechanical strength of a molded article is not deteriorate, which is preferred.

The weight average fiber length of the carbon fibers contained in an injection-molded article constituting good appearance is generally less than 1 mm.

Carbon fibers each having different fiber length can be used together in the present invention. In other words, the carbon fibers used in the present invention may have a single peak in the weight average fiber length, and may have a plurality of peaks therein.

The average fiber length of carbon fibers can be obtained by, for example, measuring fiber lengths of 100 fibers arbitrarily extracted from a molded article up to 1 mm unit using a venire caliper or the like and calculating based on the following formula (a).

When fiber length of individual carbon fibers is Li and the number of the carbon fibers measured is j, a number average fiber length (Ln) and a weight average fiber length (Lw) are obtained by the following formulae (a) and (b).

$$Ln = \Sigma Li/j \quad (a)$$

$$Lw = (\Sigma Li^2)/(\Sigma Li) \quad (b)$$

When the fiber length is a constant length, the number average fiber length and weight average fiber length are the same value.

The carbon fibers can be extracted from the molded article by subjecting the molded article to a heat treatment of about 500° C.×1 hour, and removing a resin in a furnace.

(Fiber Diameter)

Fiber diameter of the carbon fibers used in the present invention is appropriately determined depending on the kind of carbon fibers, and is not particularly limited. Generally the average fiber diameter is in a range of preferably 3 μm to 50 μm, more preferably 4 μm to 12 μm, and still more preferably 5 μm to 8 μm. The average fiber diameter used herein means a diameter of a single fiber of the carbon fibers. Therefore, when the carbon fibers have a fiber bundle shape, the fiber diameter means a diameter of a carbon fiber (single fiber) constituting a fiber bundle, not a diameter of a fiber bundle. The average fiber diameter of carbon fibers can be measured by, for example, the method described in JIS R-7607:2000.

(Volume Fraction of Carbon Fibers)

In the present invention, a volume fraction (hereinafter sometimes simply referred to as "Vf") of the carbon fibers contained in the molded article, defined by the following formula (c) is not particularly limited. However, the volume fraction (Vf) of the carbon fibers contained in the molded article is preferably 10 to 60 Vol %, more preferably 20 to 50 Vol %, and still more preferably 25 to 45 Vol %.

$$\text{Volume fraction } (Vf) \text{ of carbon fibers} = 100 \times \text{carbon fiber volume}/(\text{carbon fiber volume} + \text{thermoplastic resin volume}) \quad (c)$$

When the volume fraction (Vf) of carbon fibers in the molded article is 10 Vol % or more, desired mechanical properties are easy to be obtained. On the other hand, when the volume fraction (Vf) of carbon fibers in the molded article does not exceed 60 Vol %, flowability in using in press molding and the like is satisfactory, and a molded article having desired shape is easy to be obtained.

(Form of Fibers)

The carbon fibers used in the present invention may be a single fiber shape composed of a single fiber and may be a fiber bundle shape including a plurality of single fibers, regardless of the kind thereof.

The carbon fibers used in the present invention may be only a single fiber shape, may be only a fiber bundle shape, and may be a mixture of those. When the carbon fibers including only a fiber bundle shape are used, the number of single fibers constituting each fiber bundle may be nearly uniform in each fiber bundle, or may be different therein.

(Two-Dimensional Random)

The long axis direction of the carbon fibers are preferably two-dimensionally randomly dispersed in in-plane directions of the molded article.

The term "two-dimensionally randomly dispersed" used herein means the state that carbon fibers are disorderly oriented, not in a specific direction such as one direction, of in-pane directions of a molded article, and on the whole, are arranged on a sheet plane without showing specific directionality. The molded article obtained using the discontinuous fibers two-dimensionally randomly dispersed is a substantially isotropic molded article free of in-plane anisotropy.

The term "in-plane directions of a molded article" are directions vertical to a plate thickness direction of a molded article. The term means indefinite directions on the same plane (parallel surface crossing at right angle to a plate thickness direction), whereas a longitudinal direction or width direction shows a definite direction, respectively.

The degree of orientation of "two-dimensional random" is evaluated by obtaining a ratio between tensile moduli in two directions crossing to each other. Tensile moduli in an arbitrary direction of a molded article and a direction crossing at right angle thereto are measured. When (Eδ) ratio obtained by dividing large value of those values by small value of those values is 2 or less, more preferably 1.5 or less, and still more preferably 1.3 or less, it can be evaluated that carbon fibers are two-dimensionally randomly dispersed.

(Polyamide Resin)

The polyamide resin used in the present invention is not particularly limited. Examples of the polyamide resin that can be used include: a homopolymer such as polyamide 6, polyamide 11, polyamide 12, polyamide 46, polyamide 56, polyamide 410, polyamide 510, polyamide 66, polyamide 610, polyamide 612, polyamide 1010, polyamide 4T, polyamide 5T, polyamide 5I, polyamide 6T, polyamide 6I, polyamide 4,6 copolymer, polyamide 6.12, polyamide 9T, polyamide MXD6; polyamide (polyamide PACMI) obtained by polymerizing isophthalic acid and bis(3-methyl-4-aminocyclohexyl)methane; and a copolymer or a mixture thereof.

Of those polyamide resins, aliphatic polyamide is preferably used. Polyamide 6, polyamide 66 or polyamide 610 is more preferably used. Polyamide 6 or polyamide 66 is still more preferably used, and polyamide 6 is particularly preferably used.

The polyamide resin may be used in one kind alone, and may be used as mixtures of two or more kinds. Examples of the embodiment using two or more kinds of polyamide resins include an embodiment using polyamide resins having different softening point or melting point, and an embodiment using polyamide resins having different average molecular weight, but the present invention is not limited to those embodiments.

[Other Thermoplastic Resins]

The following thermoplastic resins may be added as resins other than the polyamide resin to the resin composition in a range that does not impair the effect of the present invention.

Examples of the other thermoplastic resins include:

a polyolefin resin such as polyethylene resin, polypropylene resin, polybutadiene resin or polymethyl pentene resin;

a vinyl resin such as vinyl chloride resin, vinylidene chloride resin, vinyl acetate resin or polyvinyl alcohol resin;

a styrene resin such as polystyrene resin, acrylonitrile-styrene resin (AS resin) or acrylonitrile-butadiene-styrene resin (ABS resin);

a polyester resin such as polyethylene terephthalate resin, polyethylene naphthalate resin, polybutylene terephthalate resin, polytrimethylene terephthalate resin or liquid crystal polyester;

a (meth)acryl resin such as polyacetal resin, polycarbonate resin, polyoxymethylene resin or polymethyl methacrylate resin;

a polyacrylate resin, a thermoplastic polyimide resin, a polyamide imide resin, a polyether imide resin, a polyether nitrile resin, a polyphenylene ether resin, a phenoxy resin, a polyphenylene sulfide resin, a polysulfone resin, a modified polysulfone resin, a polyether sulfone resin, a polyketone resin, a polyether ketone resin, a polyether ether ketone resin, a polyether ketone ketone resin or a urethane resin;

a fluorine resin such as polytetrafluoroethylene; and a polybenzimidazole resin.

The thermoplastic resin separately added may be one kind and may be two or more kinds. Examples of the embodiment using two or more kinds of the thermoplastic resins include an embodiment using thermoplastic resins having different softening point or melting point, and an embodiment using thermoplastic resins having different average molecular weight, but the present invention is not limited to those embodiments.

[Copper Compound and Potassium Halide]

The resin composition used in the present invention contains a copper compound and potassium halide, wherein (1) the copper compound is contained in an amount of 0.1 parts by mass relative to 100 parts by mass of the polyamide resin. Furthermore, (2) a mass ratio of potassium halide/copper compound is preferably more than 0 and 3.0 or less.

(Copper Compound)

Specific examples of the copper compound include cuprous chloride, cupric chloride, cupric bromide, cuprous iodide, cupric iodide, cupric sulfate, cupric nitrate, copper phosphate, cuprous acetate, cupric acetate, cupric salicylate, cupric stearate, cupric benzoate; and copper compounds in which the above inorganic copper halide is combined with xylylenediamine, 2-mercaptobenzimidazole, benzimidazole or the like. Above all, preferred examples of the copper compound include copper halide such as copper iodide, cuprous bromide, cupric iodide or cuprous chloride, and copper acetate, and copper iodide is most preferably used.

The amount of the copper compound added is 0.1 parts by mass or more relative to 100 parts by mass of the polyamide resin. When the amount of the copper compound added is 0.1 parts by mass or more, the problem of the decrease of a molecular weight in heating a composite material (problem of heat deterioration) can be solved.

On the other hand, the upper limit of the amount of the copper compound added is preferably 0.5 parts by mass or less, more preferably 0.3 parts by mass or less, and still more preferably 0.2 parts by mass or less, relative to 100 parts by mass of the polyamide resin. When the amount of the copper compound added is 0.5 parts by mass or less, the addition effect of the copper compound is not decreased, and such an amount is an effective addition amount.

(Potassium Halide)

Examples of the potassium halide include potassium iodide, potassium bromide and potassium chloride. Of those, potassium iodide is preferably used.

(Mass Ratio of Potassium Halide/Copper Compound)

In the present invention, (2) a mass ratio of potassium halide/copper compound is preferably more than 0 and 3.0 or less, and the upper limit thereof is more preferably 2.0 or less, still more preferably 1.0 or less, and still further preferably less than 1.0. The lower limit of the mass ratio of potassium halide/copper compound is preferably 0.1 or more, more preferably more than 0.1, still more preferably 0.2 or more, and particularly preferably 0.5 or more. When the mass ratio is within this range, the decrease of a molecular weight of the polyamide resin caused in a preheating step before cold pressing can be suppressed, and the decrease of a number average molecular weight can be further effectively suppressed.

The copper compound forms a complex with an amide group of the polyamide resin, and suppresses the decomposition of the polyamide resin. It has been found that the potassium halide assists the copper compound to suppress the decomposition, and when the mass ratio of potassium halide/copper compound is within the above range, the potassium halide and copper compound are preferable. When the mass ratio of potassium halide/copper compound is 3.0 or less, excessive decomposition of the polyamide resin by potassium halide can be suppressed. On the other hand, when the mass ratio of potassium halide/copper compound exceeds 0, the potassium halide assists the copper compound to suppress the decomposition as described above, and the molded article has satisfactory appearance.

(More Remarkable Problems in Present Invention)

When the carbon fibers in the present invention are discontinuous carbon fibers having a weight average fiber length of 1 mm or more and 100 mm or less, the problems of the present invention become more remarkable.

Specifically, when a composite material containing discontinuous carbon fibers having a weight average fiber length of 1 mm or more and 100 mm or less as the carbon fibers is used, it is necessary to heat the composite material in higher temperature region for longer period of time than the conventional period of time in order to improve flowability during molding. This is, for example, the case of heating at 275 to 330° C. for 5 to 20 minutes.

The decrease of a molecular weight of the polyamide resin present in a surface layer region is increased under the severe heating conditions, and the effect of the present invention becomes particularly effective.

Therefore, it is preferred in the molded article of the present invention that a copper compound and potassium halide are present in the surface layer region of the molded article.

Particularly, when the composite material has been heated in IR oven, if the carbon fibers are present in the surface layer region, the polyamide resin present in the surface layer region is exposed to further sever heating conditions. Therefore, when the carbon fibers, copper compound and potassium halide are present in the surface layer region of the molded article, the effect of the present invention can be further remarkably exhibited.

In Patent Document 3 (JP-A-2014-118426) described before, cold pressing is performed just after reaching a preheating temperature of 280° C., and a composite material is not molded by heating in severe environment.

Furthermore, even when molded by injection molding, heating time is short and oxygen concentration does not increase. Thus, a composite material is not heated in severe environment.

(Number Average Molecular Weight of Polyamide Resin)

The molded article obtained by the production method in the present invention preferably has a ratio of a number average molecular weight of the polyamide resin present in at least one surface layer region to a number average molecular weight of the polyamide resin present in a central region of the molded article of more than 0.4 and less than 1.0.

Figure 1:
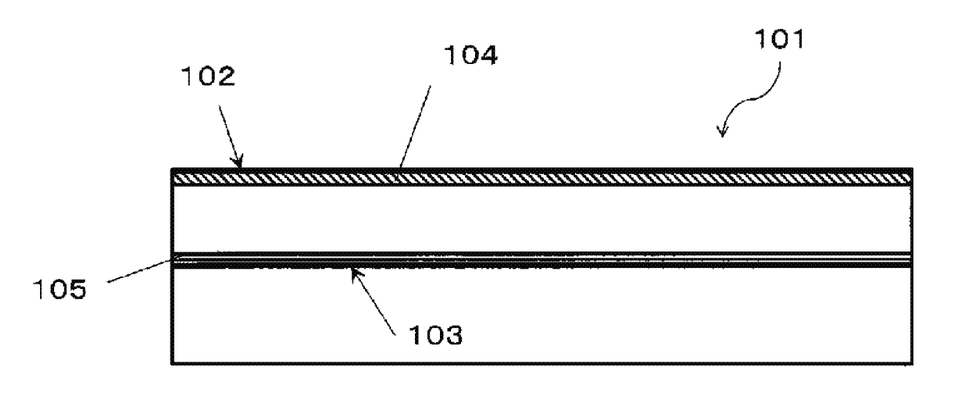
FIG. 1 is a schematic view of a cross-section of the molded article of the present invention, and is an explanatory view of a surface layer region and a central region.

The term "surface layer region" means a region of less than 50 µm in a thickness direction from the surface of the molded article, and the term "central region" means a region of less than 50 µm toward the surface from the central cross-section of the molded article.

The ratio of a number average molecular weight of the polyamide resin present in the surface layer region to a number average molecular weight of the polyamide resin present in a central region is preferably 0.5 or more and less than 1.0, and more preferably 0.5 or more and 0.9 or less.

The composite material in the present invention can suppress the decrease of a molecular weight of the polyamide resin in a surface layer region thereof even if heated under severe conditions. By this, the decrease of a molecular weight of the surface layer region of the press-molded article after cold pressing is suppressed, and as a result, the press-molded article having excellent appearance and weather resistance can be obtained.

Specifically, the number average molecular weight of the polyamide resin present in the surface layer region is preferably 7000 or more. The number average molecular weight is measured by GPC method.

By controlling the number average molecular weight of the surface of the molded article as above, for example, in the case of performing surface treatment or coating, there is a possibility that it is easy to control adhesiveness between a treating agent and a molded article.

[Black Pigment]

It is preferred in the method for producing a molded article in the present invention that black pigment is contained in the resin composition. As the specific addition amount, the black pigment is contained in an amount of 0.1 parts by mass or more and 20 parts by mass or less, relative to 100 parts by mass of the polyamide resin.

When the black pigment is contained in the polyamide resin in an amount of 0.1 parts by mass or more, weather resistance is enhanced, and this is preferred. On the other hand, when the amount of the black pigment added is 20 parts by mass or less, the resin becomes the state of high viscosity and high thermal conductivity when performing molding, and as a result, flowability during molding is difficult to decrease and moldability is difficult to be deteriorated. The amount of the black pigment in the present invention is more preferably 0.3 parts by mass or more and 10 parts by mass or less, and still more preferably 0.3 parts by mass or more and 2 parts by mass or less, relative to 100 parts by mass of the polyamide resin.

The black pigment is preferably at least one black pigment selected from the group consisting of carbon black, titanium black, furnace black, acetylene black, lamp black, aniline black and sulfur black. Particularly black pigment including carbon particles, for example, carbon black, is most preferred.

The black pigment such as carbon black is an ultraviolet absorber. The black pigment has a role of improving weather resistance, but does not almost have the suppression effect of the decrease of a molecular weight of the polyamide resin present in the surface layer region in severe heating conditions (heating using IR oven, high temperature gas or the like).

[Other Agents]

The resin composition may contain additives such as a flame retardant, UV absorber, a light stabilizer, an antioxidant, a heat stabilizer, a pigment, a release agent, a softening agent, a plasticizer and a surfactant, and a thermosetting resin, in amounts that do not impair the effect of the present invention.

[Method for Producing Composite Material]

The term "composite material" used in the description means a material before producing a molded article containing a resin composition and carbon fibers, and is simply referred to as a "composite material".

The composite material used in the present invention can be generally produced using the conventional methods. For example, a two-dimensional randomly arranged mat as a precursor of a composite material and a method for producing the same are described in detail in U.S. Pat. No. 8,946,342 and JP-A-2013-49208.

[Method for Producing Molded Article (Cold Press Molding)]

Press molding using cold press is used as a preferable molding method in producing a press-molded articles of the present invention.

In the cold pressing, for example, a composite material previously preheated to a first predetermined temperature is placed in a mold set to a second predetermined temperature, and pressuring and cooling are then performed.

Specifically, the cold pressing includes at least the following steps A-1) and A-2).

Step A-1) Step of heating a composite material to a melting point or higher of a polyamide resin Step A-2) Step of placing the composite material heated in the step A-1) in a mold having a temperature controlled to lower than a melting point of the polyamide resin, and pressuring.

Even in case where the resin composition further contains a resin (crystalline or amorphous thermoplastic resin or the like) other than the polyamide resin, the composite material is heated to a melting point or higher of the polyamide resin, and then placed in a mold having a temperature controlled to lower than a melting point of the polyamide resin.

A molded article can be produced by molding the composite material through those steps.

In placing the composite material in a mold, a single (one sheet) composite material or plural sheets of the composite material are used conforming to a plate thickness of the target molded article. In the case of using plural sheets, the plural sheets may be previously laminated and then heated, the composite materials heated may be laminated and then placed in a mold, or the composite materials heated may be sequentially laminated in a mold. In the case of laminating, it is preferred that the difference in temperature between the composite material of the undermost layer and the composite material of the uppermost layer is small, and from this standpoint, it is preferred that the composite materials are laminated before placing in a mold.

The above each step is required to be performed in the order described above, but other step may be included between those steps. The other step includes, for example, a shaping step of previously shaping the composite material into a shape of a cavity of the mold using a shaping mold other than the mold used in the step A-2), before the step A-2).

The step A-2) is a step of applying a pressure to the composite material to obtain a molded article having a desired shape. Molding pressure in this case is not particularly limited, but is preferably less than 20 MPa, and more preferably 10 MPa or less, per a projected area of a cavity of the mold.

As a matter of course, various steps may be included between the above steps when performing press molding, and for example, a vacuum compression molding that performs press molding while vacuuming may be used.

(Problems in Cold Pressing)

In the case of producing a press-molded article by cold pressing, the step of previously heating a composite material (step A-1) is inevitably included. When the composite material has been heated, oxygen present in the air reacts with the polyamide resin, and the decrease of a molecular weight is unavoidable. In the conventional resin composition, in performing cold pressing, the decrease of a molecular weight generated by preheating beforehand cannot be suppressed.

(Hot Pressing)

Hot pressing is described below. The hot pressing includes at least the following steps B-1) to B-3).

Step B-1) Step of placing a composite material in a mold

Step B-2) Step of increasing a temperature of the mold to a softening temperature or higher of a thermoplastic resin, and pressuring Step B-3) Step of adjusting the temperature of the mold to lower than the softening point of the thermoplastic resin, and molding When a press-molded article has been produced by hot pressing, the composite material is placed in a mold at ordinary temperature without previously heating the composite material (step B-1), and the temperature of the mold is increased to a softening temperature or higher of the thermoplastic resin, and a pressure is applied (step B-2). In other words, since the temperature of the thermoplastic resin is increased to its softening temperature or higher in the mold, the thermoplastic resin does not substantially react with oxygen, and the decrease of a molecular weight in a surface layer region of the composite material is not almost generated.

(The "surface layer region of a composite material" is a region of less than 50 μm from the surface of the composite material, and the "central region of the composite material" is a region of less than 50 μm toward the surface from a central cross-section of the composite material.)

Even in hot pressing, when previously heated, the composite material is exposed to high temperature and oxygen atmosphere in the heating step similar to cold pressing. Therefore, the problems in the present invention occur.

[Molded Article]

(Thickness of Molded Article)

The thickness of the molded article obtained by the production method of the present invention is not particularly limited, but is generally a range of 0.01 mm to 100 mm, preferably 0.01 mm to 10.0 mm, and more preferably 0.1 mm to 5.0 mm.

When the molded article has a laminate constitution including a plurality of layers, the above thickness does not mean the thickness of each layer, but means the overall thickness of the molded article as the total of a thickness of each layer.

The molded article may have a single layer structure including a single layer, and may be a laminate structure including a plurality of layers.

The embodiment of the molded article having the laminate structure may be an embodiment in which a plurality of layers each having the same composition are laminated, and may be an embodiment in which a plurality of layers each having different composition are laminated.

The lower limit of the thickness of the molded article is more preferably 0.1 mm or more, still more preferably 0.3 mm or more, particularly preferably 0.5 mm or more, and most preferably 1.0 mm or more.

EXAMPLES

The present invention is specifically described below by reference to examples, but the invention is not construed as being limited to those.

1. Raw materials used in following production examples and examples are as follows. The decomposition temperature is the measurement result by thermogravimetric analysis.

PAN-based carbon fibers: Carbon fibers "TENAX" (registered trademark) UTS50-24K (average fiber diameter: 6.9 μm) manufactured by Toho Tenax Co., Ltd.

Polyamide 6: Crystalline resin, melting point 225° C., decomposition temperature (in the air) 300° C.

Copper compound: Trade name "Cuprous Iodide" manufactured by Nihon Kagaku Sangyo Co., Ltd.

Potassium halide: Trade name "Potassium Iodide" manufactured by Ise Chemicals Corporation 2. Each value in the examples was obtained by the following method.

(1) Analysis of Volume Fraction (Vf) of Carbon Fibers

A molded article was burned in a furnace at 500° C. for 1 hour to remove a thermoplastic resin, and carbon fiber content and a mass of the thermoplastic resin were calculated by weighing the mass of a sample before and after the treatment. Using a specific gravity of each component, the volume fractions of the carbon fibers and thermoplastic resin were calculated. Regarding a composite material, the volume fraction of the carbon fibers contained therein is expressed by Vf.

$$Vf=100 \times \text{volume of carbon fibers}/(\text{volume of carbon fibers}+\text{volume of thermoplastic resin}) \quad \text{Formula (c)}$$

(2) Analysis of Weight Average Fiber Length of Carbon Fibers Contained in Molded Article The weight average fiber length of carbon fibers contained in a molded article was obtained as follows. The molded article was heated in a furnace at 500° C. for about 1 hour to remove a thermoplastic resin, the lengths of 100 carbon fibers randomly extracted were measured with a vernier caliper and a loupe up to 1 mm unit and recorded, and the weight average fiber length (Lw) was obtained by the following formula from lengths (Li wherein i is an integer of 1 to 100) of the entire carbon fibers measured.

$$Lw=(\Sigma Li^2)/(\Sigma Li) \quad (b)$$

The weight average fiber length of carbon fibers contained in a composite material can be measured in the same method as above.

(3) Measurement of Color Difference

The color difference was measured with CM-600d manufactured by Konica Minolta, Inc. using an initial molded article and a molded article after irradiation with xenon. The color difference ($\Delta E^*ab$) was evaluated by D65, SCI (excluding specular reflection light) as an observation light source in a visual field of 10° based on the test standard of JIS K5600-4-4: 1999 (ISO7724-1: 1984). Similar to the following evaluation of appearance, Super Xenon Weather Meter SX75 manufactured by Suga Test Instruments Co., Ltd. was used for xenon irradiation, the test method was according to SAE J2527 (2004. 02), and the test was conducted until reaching 2500 kJ/m² as irradiation energy.

(4) Evaluation of Appearance

Appearance of a test sample of a molded article after a weatherability test was visually observed using appearance of the test sample before the weatherability test as reference appearance, and four-grade functional evaluation was performed from standpoints of discoloration, exposure of reinforcing fibers, and the like.

In the weatherability test, Super Xenon Weather Meter SX75 manufactured by Suga Test Instruments Co., Ltd. was used as a tester. The test method was according to SAE J2527 (2004. 02), and the test was conducted until reaching 2500 kJ/m² as irradiation energy.

Excellent: Difference to reference appearance is not almost recognized.

Good: Difference to reference appearance is recognized, but fiber bundles and single fibers are impregnated with resin.

Better: Difference to reference appearance is recognized. Resin is impaired in a part of single fibers, and appearance is slightly deteriorated. However, the appearance is practically acceptable level.

Bad: Difference to reference appearance is apparently recognized. The resin in reinforcing fibers is impaired and thereby fiber bundles and single fibers that are not impregnated with resin are exposed. This state is practically unacceptable level.

(5) Measurement of Number Average Molecular Weight

A sample to be measured was obtained by cutting a surface layer region of a molded article (or a central region of a molded article) after cold pressing with a flat sword. The entire region of a test piece of 135 mm×65 mm was cut with a flat sword and a sample for measurement was obtained. Sampling weight was 80 to 120 mg.

Molecular weight was obtained by gel permeation chromatography (GPC). Apparatus used was HLC-8220GPC manufactured by Tosoh Corporation, a detector used was a differential refractometer (RI), and a solvent used was obtained by adding $CF_3COONa$ to hexafluoroisopropanol (HFIP) such that the concentration is 10 mM (mol/l). Columns used were one HFIP-LG and two HFIP-806M, manufactured by Shodex. Flow rate of a solvent was 0.8 ml/min, and a concentration of a sample was about 0.1 wt/vol %. A sample was filtered with a filter to remove insoluble content. Thus, a sample for measurement was obtained. Number average molecular weight (Mn) was calculated by polymethyl methacrylate (PMMA) conversion based on an elution curve obtained.

Example 1

1. Preparation of Resin Composition

Polyamide 6 resin Akulon F126 manufactured by DSM was used as a matrix resin. The above-described copper iodide (trade name "Cuprous Iodide" manufactured by Nihon Kagaku Sangyo Co., Ltd.) and potassium iodide (manufactured by Ise Chemicals Corporation) were mixed, and carbon black "BP800" manufactured by Cabot as black pigment was added thereto. The resulting mixture was kneaded by a twin-screw extruder to obtain a carbon black masterbatch.

The carbon black masterbatch obtained was added to the polyamide 6 resin Akulon F126 manufactured by DSM so as to be diluted 50 times (carbon black masterbatch 2%), and the resulting mixture was kneaded and extruded by a twin-screw extruder. Thus, a resin composition was obtained.

Parts by mass of copper iodide, potassium iodide and black pigment (carbon black) contained in the resin composition when the amount of the polyamide 6 (nylon 6) is 100 parts by mass are shown in Table 1.

2. Preparation of Composite Material

Using the carbon fibers "Tenax" (registered trademark) UTS50-24K (average fiber diameter: 6.9 μm, the number of single fibers: 24,000) manufactured by Toho Tenax Co., Ltd. cut into an average fiber length of 20 mm as carbon fibers, and using the resin composition obtained above, a composite material of two-dimensionally randomly oriented carbon fibers and polyamide 6 resin was prepared based on the method described in U.S. Pat. No. 8,946,342 by designing such that the volume fraction of the carbon fibers is 35%.

3. Cold Pressing

The composite material obtained was cut into a size of 390 mm×390 mm, the composite material was heated by an infrared heater (triple IR heater manufactured by NGK Insulators, Ltd.) such that the surface temperature thereof reaches 300° C., and the heating was then maintained for 500 seconds (the heating conditions are extremely severer than the conventional heating conditions, but moldability is extremely excellent).

A mold having flat-plate like molding cavity of 400 mm×400 mm was used as the mold. The temperature of the mold was set to 150° C., and the composite material heated was placed in the mold, and pressurized under a pressing pressure of 20 MPa for 1 minute. Thus, a molded article was obtained. The molded article obtained had a thickness of 2.6 mm Copper iodide and potassium iodide were present in a surface layer region of the molded article obtained. It could be confirmed that carbon fibers are present in the surface layer region of the molded article obtained. The evaluations are shown in Table 1.

Example 2

A molded article was obtained in the same manner as in Example 1, except that the resin composition was prepared by changing mass parts of copper iodide, potassium iodide and black pigment (carbon black) to the polyamide 6 resin as shown in Table 1. The molded article obtained had a thickness of 2.6 mm Copper iodide and potassium iodide were present in a surface layer region of the molded article obtained. The evaluations are shown in Table 1.

Example 3

A molded article was obtained in the same manner as in Example 1, except that the resin composition was prepared by changing mass parts of copper iodide, potassium iodide and black pigment (carbon black) to the polyamide 6 resin as shown in Table 1. The molded article obtained had a thickness of 2.6 mm Copper iodide and potassium iodide were present in a surface layer region of the molded article obtained. The evaluations are shown in Table 1.

Example 4

A molded article was obtained in the same manner as in Example 1, except that the resin composition was prepared by changing mass parts of copper iodide, potassium iodide and black pigment (carbon black) to the polyamide 6 resin as shown in Table 1. The molded article obtained had a thickness of 2.6 mm Copper iodide and potassium iodide were present in a surface layer region of the molded article obtained. The evaluations are shown in Table 1.

Example 5

A molded article was obtained in the same manner as in Example 1, except that the resin composition was prepared by changing mass parts of copper iodide, potassium iodide and black pigment (carbon black) to the polyamide 6 resin as shown in Table 1. The molded article obtained had a thickness of 2.6 mm Copper iodide and potassium iodide were present in a surface layer region of the molded article obtained. The evaluations are shown in Table 1.

Example 6

A molded article was obtained in the same manner as in Example 1, except that the resin composition was prepared by changing mass parts of copper iodide, potassium iodide and black pigment (carbon black) to the polyamide 6 resin as shown in Table 1. The molded article obtained had a thickness of 2.6 mm Copper iodide and potassium iodide were present in a surface layer region of the molded article obtained. The evaluations are shown in Table 1.

Example 7

A molded article was obtained in the same manner as in Example 1, except that the resin composition was prepared by changing mass parts of copper iodide, potassium iodide and black pigment (carbon black) to the polyamide 6 resin as shown in Table 1. The molded article obtained had a thickness of 2.6 mm Copper iodide and potassium iodide were present in a surface layer region of the molded article obtained. The evaluations are shown in Table 1.

Comparative Example 1

A molded article was obtained in the same manner as in Example 1, except that the resin composition was prepared by changing mass parts of copper iodide, potassium iodide and black pigment (carbon black) to the polyamide 6 resin as shown in Table 1. The evaluations are shown in Table 1.

Comparative Example 2

A molded article was obtained in the same manner as in Example 1, except that the resin composition was prepared by changing mass parts of copper iodide, potassium iodide and black pigment (carbon black) to the polyamide 6 resin as shown in Table 1. The evaluations are shown in Table 1.

Comparative Example 3

A molded article was obtained in the same manner as in Example 1, except that the resin composition was prepared by changing mass parts of copper iodide, potassium iodide and black pigment (carbon black) to the polyamide 6 resin as shown in Table 1. The evaluations are shown in Table 1.

Comparative Example 4

A molded article was obtained in the same manner as in Example 1, except that the resin composition was prepared by changing mass parts of copper iodide, potassium iodide and black pigment (carbon black) to the polyamide 6 resin as shown in Table 1. The evaluations are shown in Table 1. Because potassium iodide was not added, the appearance of the molded article colored yellow, and the appearance was deteriorated.

Comparative Example 5

A molded article was obtained in the same manner as in Example 1, except that the resin composition was prepared by changing mass parts of copper iodide, potassium iodide and black pigment (carbon black) to the polyamide 6 resin as shown in Table 1. The evaluations are shown in Table 1.

Comparative Example 6

A molded article was obtained in the same manner as in Example 1, except that the resin composition was prepared by changing mass parts of copper iodide, potassium iodide and black pigment (carbon black) to the polyamide 6 resin as shown in Table 1. The evaluations are shown in Table 1.

Comparative Example 7

A composite material was prepared in the same manner as in Comparative Example 1, except for changing the amount of black pigment to 0.60 parts by mass. The composite material was preheated until the surface temperature thereof reaches 280° C., and just after reaching 280° C., the composite material was subjected to cold press molding. Because the preheating time was short, moldability was poor. Furthermore, a number average molecular weight of the polyamide resin present in the surface layer region decreased as shown in Table 1, but because heating environment was mild, remarkable deterioration was not appeared.

Comparative Example 8

A molded article was obtained in the same manner as in Comparative Example 1, except that black pigment was not used. The results are shown in Table 1.

Example 8

A molded article was obtained in the same manner as in Example 1, except that the resin composition was prepared by changing mass parts of potassium iodide to the polyamide 6 resin to 0.60 parts by mass and changing the mass ratio of potassium iodide/copper iodide to 4.0. As a result of evaluation of the molded article obtained, color difference (ΔE*ab) was 1.8, and the appearance evaluation was "Better".

Reference Example 1

The same composite material as used in Example 1 was cut into a size of 95 mm×195 mm, and placed in a mold having a flat plate-like molding cavity of 300 mm×300 mm without heating with an infrared heater. In this case, preheating was not conducted. The mold was heated to 260° C., and then the composite material was hot-pressed by heating under 1 MPa for 10 minutes. Thus, a molded article was obtained. The results are shown in Table 2.

Reference Example 2

A resin composition was prepared in the same manner as in Example 1. The same carbon fibers as used in Example 1 were cut into a length of 5 mm, and dry-blended with the resin composition such that the volume fraction of the carbon fibers are 5%. The resulting blend was injection-molded using 110 ton electromotive injection molding machine (J110AD) manufactured by The Japan Steel Works, Ltd. at cylinder temperatures of C1/C2/C3/C4/N=230° C./240° C./250° C./260° C./250° C. (C1 to C4 are cavities, and N is a nozzle) in a molding cycle of 35 seconds to obtain a dumbbell (molded article) for tensile test having a thickness of 4 mm. The evaluations of the injection-molded article obtained are shown in Table 2.

Reference Example 3

A resin composition was prepared in the same manner as in Comparative Example 1, and a blend was injection-molded in the same manner as in Reference Example 2. The results are shown in Table 2.

As is understood from the comparison between Reference Example 2 and Reference Example 3, in the molded articles molded by injection molding, the evaluations are the same regardless of the content of the copper compound. This is due to that, in the melt kneading of a polyamide resin in injection molding, molding cycle is short, the heating environment is not severe, the amount of oxygen in a cylinder is limited, and only a surface part of the molded article is not specifically heated.

TABLE 1

|  | Example 1 | Example 2 | Example 3 | Example 4 | Example 5 | Example 6 | Example 7 | Comparative Example 1 |
|---|---|---|---|---|---|---|---|---|
| Resin composition | | | | | | | | |
| Nylon 6 (parts by mass) | 100 | 100 | 100 | 100 | 100 | 100 | 100 | 100 |
| Copper iodide (parts by mass) | 0.15 | 0.15 | 0.15 | 0.21 | 0.29 | 0.15 | 0.15 | 0.03 |
| Potassium iodide (parts by mass) | 0.074 | 0.15 | 0.44 | 0.62 | 0.88 | 0.01 | 0.01 | 0.09 |
| Potassium iodide/copper iodide (mass ratio) | 0.5 | 1.0 | 3.0 | 3.0 | 3.0 | 0.1 | 0.07 | 3.0 |
| Black pigment (parts by mass) | 0.60 | 0.59 | 0.59 | 0.83 | 1.17 | 0.60 | 0.60 | 0.12 |
| Press molding method | Cold pressing | Cold pressing | Cold pressing | Cold pressing | Cold pressing | Cold pressing | Cold pressing | Cold pressing |
| Molded article | | | | | | | | |
| Volume fraction of carbon fibers (%) | 35.0 | 35.0 | 35.0 | 35.0 | 35.0 | 35.0 | 35.0 | 35.0 |
| Weight average fiber length (mm) | 20.0 | 20.0 | 20.0 | 20.0 | 20.0 | 20.0 | 20.0 | 20.0 |
| Number average molecular weight of polyamide resin present in surface layer region | 11000 | 9800 | 8600 | 7700 | 7200 | 11800 | 11500 | 5500 |
| Number average molecular weight of polyamide present in central region | 16500 | 17000 | 17000 | 17000 | 17000 | 17000 | 17000 | 17000 |
| Ratio of number average molecular weights of polyamide resins (surface layer region/central region) | 0.67 | 0.58 | 0.51 | 0.45 | 0.42 | 0.69 | 0.68 | 0.32 |
| Color difference (ΔE*a*b) | 0.6 | 1.0 | 1.4 | 2.1 | 2.5 | 2.6 | 2.5 | 3.2 |
| Appearance | Excellent | Good | Good | Good | Good | Good | Good | Bad |
| Remarks | | | | | | | | Moldability is deteriorated |

TABLE 1-continued

|  | Comparative Example 2 | Comparative Example 3 | Comparative Example 4 | Comparative Example 5 | Comparative Example 6 | Comparative Example 7. | Comparative Example 8 |
|---|---|---|---|---|---|---|---|
| Resin composition |  |  |  |  |  |  |  |
| Nylon 6 (parts by mass) | 100 | 100 | 100 | 100 | 100 | 100 | 100 |
| Copper iodide (parts by mass) | 0.06 | 0.09 | 0.15 | 0.03 | 0 | 0.03 | 0.03 |
| Potassium iodide (parts by mass) | 0.18 | 0.27 | 0 | 0.42 | 0 | 0.09 | 0.09 |
| Potassium iodide/copper iodide (mass ratio) | 3.0 | 3.0 | 0 | 14.0 | — | 3.0 | 3.0 |
| Black pigment (parts by mass) | 0.24 | 0.36 | 0.60 | 0.12 | 0.00 | 0.60 | 0.00 |
| Press molding method | Cold pressing | Cold pressing | Cold pressing | Cold pressing | Cold pressing | Cold pressing | Cold pressing |
| Molded article |  |  |  |  |  |  |  |
| Volume fraction of carbon fibers (%) | 35.0 | 35.0 | 35.0 | 35.0 | 35.0 | 35.0 | 35.0 |
| Weight average fiber length (mm) | 20.0 | 20.0 | 20.0 | 20.0 | 20.0 | 20.0 | 20.0 |
| Number average molecular weight of polyamide resin present in surface layer region | 6400 | 6800 | 12000 | 4400 | 3600 | 12900 | 5500 |
| Number average molecular weight of polyamide present in central region | 17000 | 17000 | 17000 | 17000 | 17000 | 17000 | 17000 |
| Ratio of number average molecular weights of polyamide resins (surface layer region/central region) | 0.38 | 0.40 | 0.71 | 0.26 | 0.21 | 0.76 | 0.32 |
| Color difference ($\Delta E^*a^*b$) | 2.0 | 1.5 | 0.5 | 2.7 | 7.7 | — | 15.0 |
| Appearance | Better | Better | Better | Bad | Bad | — | Bad |
| Remarks |  |  |  | Moldability is deteriorated |  |  |  |

TABLE 2

|  | Reference Example 1 | Reference Example 2 | Reference Example 3 |
|---|---|---|---|
| Resin composition |  |  |  |
| Nylon 6 (parts by mass) | 100 | 100 | 100 |
| Copper iodide (parts by mass) | 0.03 | 0.15 | 0.03 |
| Potassium iodide (parts by mass) | 0.09 | 0.07 | 0.09 |
| Potassium iodide/copper iodide (mass ratio) | 3.0 | 0.5 | 3.0 |
| Black pigment (parts by mass) | 0.12 | 0.60 | 0.12 |
| Press molding method | Hot pressing | Injection molding | Injection molding |
| Molded article |  |  |  |
| Volume fraction of carbon fibers (%) | 35.0 | 5.0 | 5.0 |
| Weight average fiber length (mm) | 20.0 | 0.2 | 0.2 |
| Number average molecular weight of polyamide resin present in surface layer region | 13700 | 16400 | 16000 |
| Number average molecular weight of polyamide resin present in central region | 17000 | 17000 | 17000 |
| Ratio of number average molecular weights of polyamide resins (surface layer region/central region) | 0.81 | 0.96 | 0.94 |
| Color difference ($\Delta E^*a^*b$) | 1.8 | 0.1 | 0.1 |
| Appearance | Excellent | Excellent | Excellent |
| Remarks |  |  |  |

INDUSTRIAL APPLICABILITY

The molded article and its production method of the present invention can be used in various constituent members, for example, an inner plate, an outer plate and a constituent member of automobiles, various electric appliances, a frame and a casing of machines, and the like. The molded article can be preferably used as automobile parts.

Although the present invention has been described in detail and by reference to the specific embodiments, it is apparent to one skilled in the art that various modifications or changes can be made without departing from the spirit and scope of the present invention.

This application is based on Japanese Patent Application No. 2015-228808 filed Nov. 24, 2015, the disclosure of which is incorporated herein by reference.

DESCRIPTION OF REFERENCE NUMERALS AND SIGNS

101 Molded article
102 Surface of molded article
103 Central cross-section of molded article
104 Surface layer region
105 Central region

What is claimed is:

1. A method for producing a molded article, the method comprising
    heating a composite material containing a resin composition and carbon fibers that are discontinuous carbon fibers having a weight average fiber length of 1 mm to 100 mm at 275 to 330° C. for 5 to 20 minutes, the resin composition containing a polyamide resin, a copper compound, potassium halide, and a black pigment ultraviolet absorber;
    reacting the polyamide resin with oxygen present in air to decrease a molecular weight of the polyamide resin such that a ratio of a number average molecular weight of the polyamide resin present in a surface layer region of the molded article to a number average molecular weight of the polyamide resin present in a central region of the molded article is more than 0.4 and less than 1.0, wherein the surface layer region is a region of less than 50 m from the surface of the molded article, and the central region is a region of less than 50 m toward the surface from a central cross-section of the molded article; and
    cold pressing the heated composite material to form the molded article,
    wherein a temperature of the cold pressing is lower than a melting point of the polyamide resin,
    wherein (1) the copper compound content is 0.1 parts by mass or more relative to 100 parts by mass of the polyamide resin, and (2) a mass ratio of potassium halide/copper compound is more than 0.1 and less than 1.0.

2. The method for molding a molded article according to claim 1, wherein (2) a mass ratio of potassium halide/copper compound is 0.2 or more and less than 1.0.

3. The method for molding a molded article according to claim 1, wherein the potassium halide is potassium iodide and the copper compound is copper iodide.

4. The method for molding a molded article according to claim 1, wherein the number average molecular weight of the polyamide resin present in the surface layer region is 7000 or more.

5. The method for molding a molded article according to claim 1, wherein the copper compound and potassium halide are present in the surface layer region of the molded article.

6. The method for molding a molded article according to claim 1,
    wherein an amount of the black pigment is 0.3 parts by mass or more and 2 parts by mass or less relative to 100 parts by mass of the polyamide resin.

7. The method for molding a molded article according to claim 1,
    wherein an amount of the black pigment is more than 0.12 parts by mass and 1.17 parts by mass or less relative to 100 parts by mass of the polyamide resin.

8. The method for molding a molded article according to claim 1,
    wherein an amount of the black pigment is more than 0.24 parts by mass and 1.17 parts by mass or less relative to 100 parts by mass of the polyamide resin.

9. The method for molding a molded article according to claim 1,
    wherein an amount of the black pigment is more than 0.36 parts by mass and 1.17 parts by mass or less relative to 100 parts by mass of the polyamide resin.

10. The method for molding a molded article according to claim 2,
    wherein the copper compound content is 0.1 parts by mass or more and 0.5 parts by mass or less relative to 100 parts by mass of the polyamide resin.

11. The method for molding a molded article according to claim 2,
    wherein the copper compound content is 0.1 parts by mass or more and 0.3 parts by mass or less relative to 100 parts by mass of the polyamide resin.

12. The method for molding a molded article according to claim 2,
    wherein the copper compound content is 0.1 parts by mass or more and 0.2 parts by mass or less relative to 100 parts by mass of the polyamide resin.

13. The method for producing a molded article according to claim 1,
    wherein the ratio of the number average molecular weight of the polyamide resin present in the surface layer region to the number average molecular weight of the polyamide resin present in the central region is more than 0.5 and less than 0.9.

14. The method for producing a molded article according to claim 1,
    wherein the weight average fiber length of the carbon fibers is 3 mm to 80 mm.

15. The method for producing a molded article according to claim 1,
    wherein the weight average fiber length of the carbon fibers is 5 mm to 60 mm.

16. The method for producing a molded article according to claim 1,
    wherein long axis directions of the carbon fibers are two-dimensionally randomly dispersed in in-plane directions of the molded article.

* * * * *